US006907643B2

(12) United States Patent
Koops et al.

(10) Patent No.: US 6,907,643 B2
(45) Date of Patent: Jun. 21, 2005

(54) VEHICLE DOOR HANDLE

(75) Inventors: Roger L. Koops, Hamilton, MI (US); Robert L. Bingle, Holland, MI (US)

(73) Assignee: Donnelly Corporation, Holland, MI (US)

(*) Notice: Subject to any disclaimer, the term of this patent is extended or adjusted under 35 U.S.C. 154(b) by 70 days.

(21) Appl. No.: 10/419,441

(22) Filed: Apr. 21, 2003

(65) Prior Publication Data

US 2003/0182762 A1 Oct. 2, 2003

Related U.S. Application Data

(62) Division of application No. 10/046,839, filed on Jan. 15, 2002, now Pat. No. 6,550,103, which is a continuation of application No. 09/597,532, filed on Jun. 20, 2000, now Pat. No. 6,349,450.

(51) Int. Cl.[7] .............................. B62B 7/00; E05B 1/00

(52) U.S. Cl. ............................ 16/438; 16/412; 16/430; 16/110.1; 16/903

(58) Field of Search .......................... 16/412, 413, 438, 16/903, 445, DIG. 41, 430, 110.1; 292/336.3, 347, 348, 76, DIG. 8, DIG. 30, DIG. 43, DIG. 65; 219/201, 202, 204, 227, 535, 547; 362/501, 511, 100, 399; 74/551.8, 551.9, 543

(56) References Cited

U.S. PATENT DOCUMENTS

| | | | | |
|---|---|---|---|---|
| 3,667,315 A | | 6/1972 | Polly, Sr. | 74/51.8 |
| 3,695,210 A | * | 10/1972 | Stein | 441/69 |
| 3,737,944 A | | 6/1973 | Szabo et al. | 16/430 |
| 3,813,729 A | | 6/1974 | Szabo et al. | 16/114.1 |
| 3,908,149 A | | 9/1975 | Gergoe et al. | 292/DIG. 23 |
| 4,041,301 A | | 8/1977 | Pelchat | 362/100 |
| 4,349,722 A | | 9/1982 | Kurth et al. | 219/202 |
| 4,471,209 A | | 9/1984 | Hollander | 219/204 |
| 4,580,822 A | | 4/1986 | Fukumoto | 16/266 |
| 4,686,741 A | | 8/1987 | Moore et al. | 16/438 |
| 4,837,892 A | | 6/1989 | Lo | 16/431 |

(Continued)

FOREIGN PATENT DOCUMENTS

| | | |
|---|---|---|
| DE | 29921826 | 4/2000 |
| GB | 1043210 | 9/1966 |
| GB | 2298748 | 1/1996 |
| GB | 2298748 | 9/1996 |
| JP | 401030895 | 2/1989 |
| JP | 10290726 | 11/1998 |
| JP | 1120529 | 1/1999 |
| JP | 2001295514 | 10/2001 |
| WO | 8807118 | 9/1988 |

OTHER PUBLICATIONS

JP Laying—open gazette No. 1–278835/89, Nov., 1989.
JP Laying—open gazette No. 1–299966/89, Dec., 1989.
JP Laying—open gazette No. 1–299967/89, Dec., 1989.

*Primary Examiner*—Chuck Y. Mah
(74) *Attorney, Agent, or Firm*—Van Dyke, Gardner, Linn & Burkhart, LLP

(57) ABSTRACT

A vehicle door handle assembly for opening a door of a vehicle includes a base which is mountable at the door of the vehicle and a handle portion which is operable to open the door via movement of the handle portion relative to the base. The handle portion includes a first portion having a first material hardness and a second portion having a second material hardness. The first material hardness is greater than the second material hardness, such that the second portion provides a softer feel to a user of the door handle assembly when opening the door of the vehicle. The door handle assembly may further include an illumination source for illuminating the handle portion and/or a heating element for heating the handle portion.

59 Claims, 4 Drawing Sheets

U.S. PATENT DOCUMENTS 4,892,342 A 1/1990 Newman et al. ............ 292/347
4,914,779 A 4/1990 Nakai et al. .................. 16/412
5,129,694 A 7/1992 Tanimoto et al. ........... 292/347
5,297,010 A 3/1994 Camarota et al. ........... 362/501
5,298,306 A 3/1994 Miller ......................... 16/430
5,390,572 A 2/1995 Gakhar et al. ................ 16/430
5,398,369 A 3/1995 Heinzelman et al. ...... 15/143.1
5,530,989 A 7/1996 Remert et al. ................ 16/430
5,651,163 A 7/1997 Tamaki ........................ 16/112
5,709,453 A 1/1998 Krent et al. .................. 362/80
5,740,586 A 4/1998 Gomas ........................ 16/430
5,769,209 A * 6/1998 Massey, III ................. 200/339
5,781,958 A 7/1998 Meessmann et al. .......... 16/431
5,857,241 A 1/1999 Camp et al. ............. 15/230.11
5,956,799 A 9/1999 Panaccione et al. ....... 15/143.1
6,018,841 A 2/2000 Kelsay et al. .............. 15/143.1
6,036,244 A 3/2000 Tyves et al. ............. 292/336.3
6,070,998 A 6/2000 Jennings et al. ............ 362/501
6,135,621 A 10/2000 Bach et al. ................. 362/399
6,164,805 A 12/2000 Hulse ......................... 362/501
6,180,212 B1 1/2001 Single et al. .............. 16/110.1
6,209,933 B1 * 4/2001 Ang et al. ............... 292/336.3

* cited by examiner

VEHICLE DOOR HANDLE

CROSS-REFERENCE TO RELATED APPLICATION

This is a divisional application of U.S. patent application Ser. No. 10/046,839, filed Jan. 15, 2002, now U.S. Pat. No. 6,550,103, which is a continuation of U.S. patent application, Ser. No. 09/597,532, filed Jun. 20, 2000 by Roger L. Koops and Robert L. Bingle for VEHICLE DOOR HANDLE, now U.S. Pat. No. 6,349,450, which is hereby incorporated herein by reference in its entirety.

BACKGROUND OF THE INVENTION

The present invention relates generally to vehicle door handles and, more particularly, to a vehicle door handle which provides a snap-together process for assembling the pivotable door handle to a base of the handle assembly at the vehicle.

A door handle for a vehicle typically comprises a pivotable handle portion and a base portion mounted at the vehicle, whereby the handle portion is pivotable to open the door from the outside of the vehicle. Typically, the pivotable handle is connected to a latch release mechanism within the door to allow the door to open where the handle is operated. Certain prior known handle portions include a pair of mounting arms which extend through the base portion and pivotably secure to the base. The arms are pivotably secured together via a metal hinge pin which extends through the arms and base. The door handle assembly further includes a spring at the hinge pin for biasing the handle in its closed position. The hinge pin must be manually inserted through openings in the arms when the openings are aligned. This is a manual process which is complicated and inefficient since an operator at the assembly plant has to properly align the openings before the hinge pin can be inserted therethrough. Furthermore, the pin is crimped to prevent accidental removal of the pin from the openings after the pin has been inserted therethrough. This is an additional process which further complicates and adds to the time of the process.

Some handles have been proposed which eliminate the need for a hinge pin by providing a pair of outward projections on the arms of the handle which are pivotably retained within slots or openings in corresponding arms of the base. An example of such a handle is disclosed in U.S. Pat. No. 5,651,163 issued to Tamaki. The outward projections thus function similar to the hinge pin of the conventional handles. While this eliminates the crimping process of the pin, such a handle still requires the projections to be aligned with the openings in the arms of the base before they may be retained therein.

During winter or other cold weather conditions, such as during rain storms and the like, a vehicle door handle, which is typically formed from a metal or rigid plastic material, may become slippery and cold and thus difficult and uncomfortable to grasp. This often results in a person's hand slipping from the handle as the person attempts to open the door of the vehicle. Additionally, the hard materials are cold to touch, which further adds to the person's discomfort when opening the door of their vehicle. An additional concern with conventional handles is that they are difficult to unlock and/or open in low light conditions.

Therefore, there is a need in the art for a vehicular door handle and base assembly which may be pivotably secured together without requiring precise alignment of pins or openings during the assembly process. Preferably, the handle also improves the comfort and ease of use by a person opening the door of the vehicle.

SUMMARY OF THE INVENTION

The present invention is intended to provide a door handle assembly for a vehicle door which allows for snap-fit assembly of a handle portion and a base portion. The handle portion may be snapped to a pair of mounting pins at the base portion, in order to pivotably secure the components together. Additionally, at least a portion of the handle may comprise a soft touch material to improve the comfort of the handle to a person opening the vehicle door.

According to a first aspect of the present invention, a door handle assembly for a door of a vehicle comprises an elongated handle and a base. The elongated handle has a pair of spaced snap clasped members. The base has a pair of spaced axle members supported at the base at each end of the axle members. The snap clasped members of the elongated handle engage a corresponding one of the axle members, such that the axle are pivotably received within the snap clasp members. The elongated handle is thus pivotable relative to the base.

According to another aspect of the present invention, a door handle assembly for a door of a vehicle comprises a handle portion and a housing. The handle portion has a front and back surface and a pair of snap clasp members extending from the back surface. The housing defines a cavity and includes a pair of axle or cross members supported at each end at the housing. The housing further includes a pair of openings in the housing positioned generally adjacent to each of the cross members. The snap clasp members of the handle portion are insertable through the openings in the housing such that each of the snap clasp members engages a corresponding one of the pair of cross members. Preferably, connection of the snap clasp members with the cross members results in an audible signal, such as a snap or click, to signal proper connection of the handle assembly. The cross members are pivotably received within the snap clasp members such that the handle portion is pivotable relative to the housing and is positioned at least partially within the cavity of the housing. Preferably, the snap clasp members define a generally C-shaped recess, which pivotally receives the cross members. Preferably, the door handle assembly further includes a biasing member which biases the handle portion at a closed position whereby the handle portion is substantially within the cavity of the housing. Preferably, the cross members are secured between a pair of mounting extensions extending from the housing and the snap clasp members are positioned at a distal end of a pair of mounting arms extending from the handle portion. Preferably, the biasing member is a coiled spring which is mounted in a spring mount extending from a side of one of the mounting extensions at the housing. One end of the coil spring engages the housing while another engages one of the mounting arms of the handle portion.

In one form, the door handle assembly may include a soft touch surface at a back surface of the handle portion, whereby the soft touch surface comprises a polymeric material having a lower hardness than a polymeric material at the front surface of the handle portion.

In another form, the door handle assembly further comprises at least one illumination source positioned at the housing and/or handle portion. The illumination source is operable to provide illumination toward the handle portion. The illumination source is preferably actuatable in response to at least one of a touch of the handle, a movement of the handle, actuation of a remote keyless entry module, a motion detection at the vehicle, and an insertion of a key into a keyhole at the door handle. Preferably, the illumination source is deactuatable following a period of time after actuation of the illumination source.

In another form, the door handle assembly comprises a heating element, which is operable to heat at least one surface of the handle portion in response to an electrical signal.

According to another aspect of the present invention, a handle assembly for a door of a vehicle comprises a base which is mountable at the door of the vehicle and a handle portion which is pivotably mounted to the base. The handle portion is operable to open the door via pivotable movement of the handle portion relative to the base. A first surface of the handle portion has a first material which has a first hardness, while a second the inner surface has a second material which has a second hardness. The first hardness is greater than the second hardness, such that the second material of the inner surface of the handle portion provides a soft touch to a user of the handle assembly. Preferably, the second material is molded at the first material. Preferably, the material is molded at an inner surface of the handle portion toward the door of the vehicle.

In one form, the door handle assembly comprises a paddle portion and a recessed base portion, whereby the paddle portion is pivotable about a generally horizontal axis at the base portion. In another form, the handle assembly comprises a pivotable strap door handle, whereby a strap handle is pivotable about a generally vertical axis at a base portion of the handle.

Therefore, the present invention provides a door handle assembly which is easily assembled by an operator at a door handle assembly plant. The engaging portion of the mounting arms of the handle portion do not have to be precisely aligned with the mounting pins at the housing of the handle assembly, and thus may be easily press fit into position by the operator. Additionally, the present invention provides an audible snap or click when the components are properly assembled together, to let the operator know that the assembly has been properly accomplished. Additionally, the present invention provides a soft touch door handle, which provides a more comfortable surface for a user to grasp when opening the door. The soft touch feel of the softer material at the handle thus softens the feel of the handle to a user, especially in cold weather conditions. Additionally, the handle assembly of the present invention may provide illumination to the handle in response to detection of a user near the handle, such that the handle is at least temporarily illuminated for easier unlocking and/or opening of the door in low light or nighttime conditions.

These and other objects, advantages, purposes and features of this invention will become apparent upon review of the following specification in conjunction with the drawings.

DESCRIPTION OF THE PREFERRED EMBODIMENTS

Figure 1:
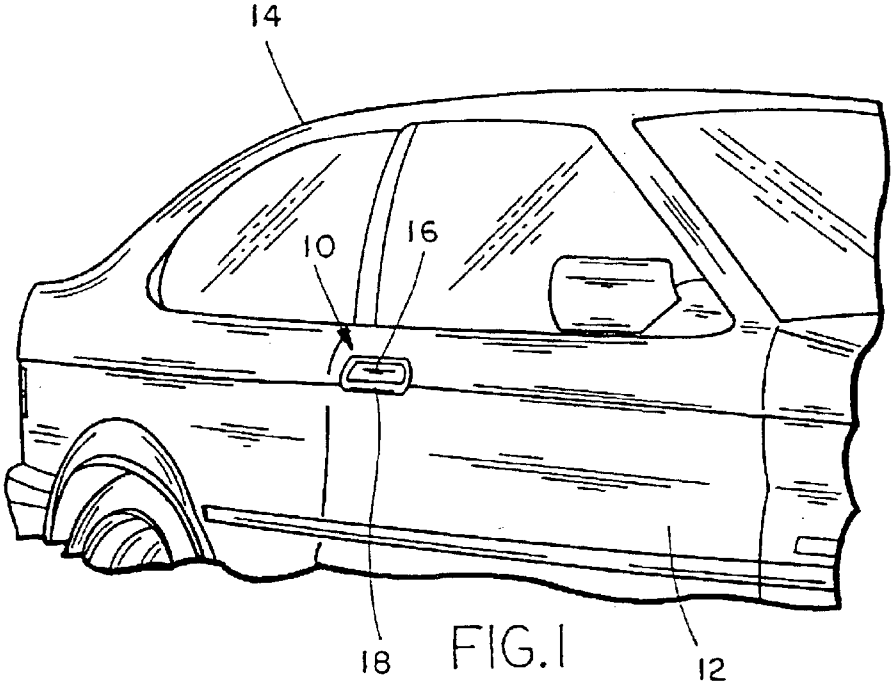
FIG. 1 is a perspective view of a vehicle incorporating a door handle assembly of the present invention.
Figure 2:
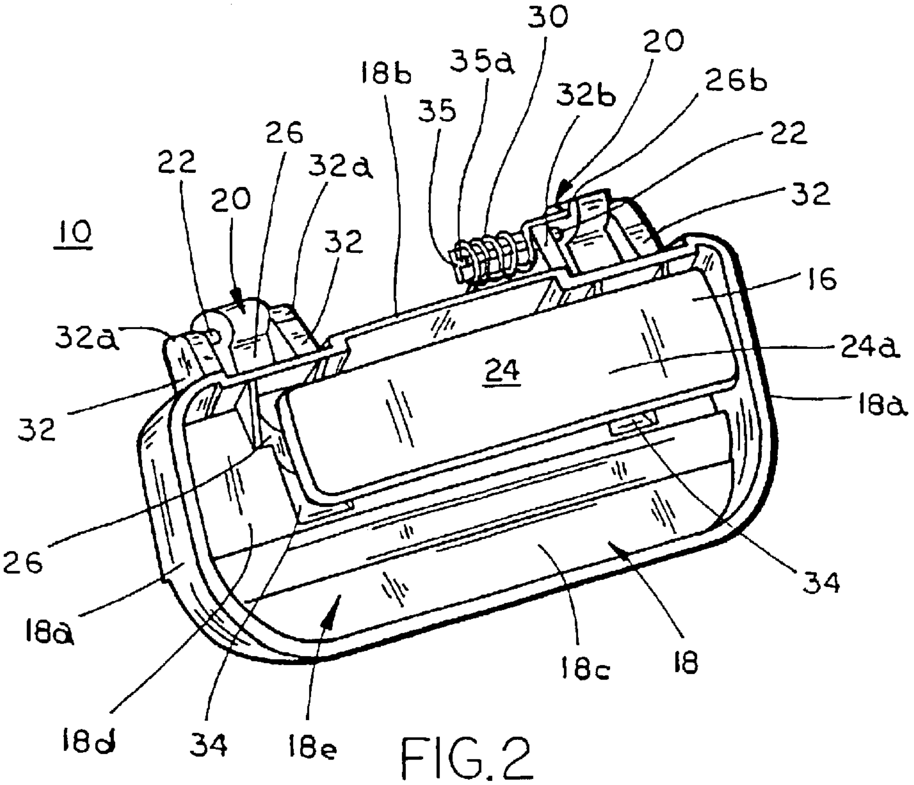
FIG. 2 is a perspective view of a snap together door handle assembly of the present invention.

Referring now specifically to the drawings and the illustrative embodiments depicted therein, a door handle assembly 10 is mounted to a side door 12 of a vehicle 14 (FIG. 1). Door handle assembly 10 is a paddle type door handle assembly, which includes a handle or paddle portion 16, which is pivotably secured to a base or housing portion 18, which in turn is secured to door 12 of vehicle 14. As is known in the art, paddle portion 16 is pivotable about a generally horizontal pivot axis relative to housing 18 and door 12 to pull a cable or linkage (not shown) within the door to release a latch (not shown) and thus open the door of the vehicle from outside the vehicle. As shown in FIG. 2, paddle portion 16 is pivotably secured to housing 18 via a pair of snap clasps 20 which pivotably receive a corresponding pair of mounting pins 22 at base 18. Each snap clasp 20 snaps onto a corresponding pin 22 to secure paddle portion 16 to base 18 without separate or insertable hinge pins or the like, such as required in conventional door handle designs. Handle assembly 10 thus provides an easier and efficient assembly process for door handle 10 over the prior art. Handle assembly 10 further provides an audible snap or click to signal secure clasping of the mounting pins 22, which further ensures proper assembly of the handle.

Figure 3:
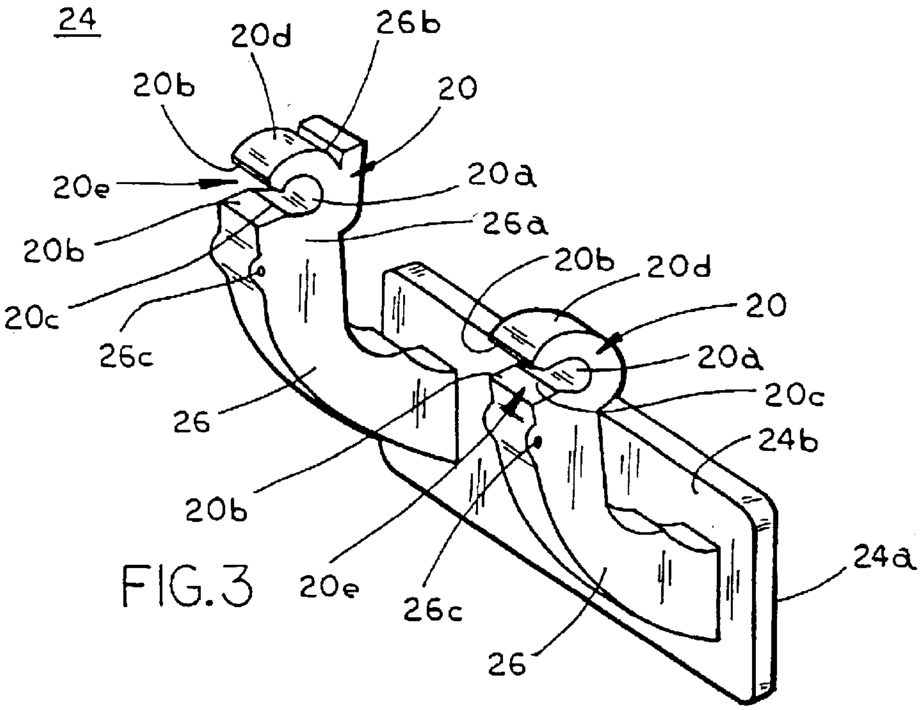
FIG. 3 is a back or rear perspective view of a paddle portion of the handle assembly of FIG. 2.

As shown in FIGS. 2 and 3, paddle portion 16 includes a handle or paddle 24 and a pair of mounting arms 26 extending therefrom and terminating at snap clasps 20. Paddle 24 has an outer surface **24*a* (FIG. 2) and an inner or back surface 24*b* (FIG. 3). Mounting arms 26 are generally L-shaped and extend inwardly and curve upwardly from inner surface 24*b* of paddle 24. Snap clasp or member 20 is positioned at an end 26*a* of each mounting arm 26 opposite the paddle portion 24. Snap clasp 20 preferably defines a generally C-shaped clasping member at outer end 26*a* of mounting arm 26, such that cross member or mounting pin 22 is pivotally received within a generally circular or cylindrical opening or passageway 20*a*. Preferably, at least one of the mounting arms 26 further includes a spring tab and/or groove 26*b* for engaging an end of a biasing member or spring 30 (FIGS. 2, 6 and 7), as discussed below. Preferably, mounting arms 26 are integrally molded to the back surface 24*b* of paddle 24, such that handle portion 16 is molded in one piece, preferably from a substantially rigid and strong polymeric material, such as a thermoplastic or a thermoset, such as nylon. The mounting arms 26 further include a connecting portion 26*c* (FIGS. 3 and 7), such as an opening or tab or the like for connecting the handle portion 16 to a cable or linkage (also not shown) within the door 12 for releasing a latch and opening the door in response to pivotal movement of handle portion 16 relative to base 18 and door 12**.

Preferably, each snap clasp 20 further includes an assembly opening **20*e* defined by tapered guide surfaces 20*b* which diverge from cylindrical opening 20*a* to provide diverging engagement or guide surfaces for guiding the cross member 22 into the recess 20*a*. This substantially obviates the need for precise alignment of the snap members to the cross members during the assembly process of the handle assembly. Guide surfaces 20*b* converge at their ends toward opening 20***a*, such that a gap defined between an inner end 20*c* of guide surfaces 20*b* is less than the diameter of the circular or cylindrical opening 20*a* through snap members 20. An upper portion 20*d* of snap clasps 20 is flexible to allow upward flexing of upper portion 20*d* such that the gap at inner end 20*c* of guide surfaces 20*b* is expandable to allow mounting pins 22 to be inserted therethrough.

Figure 4:
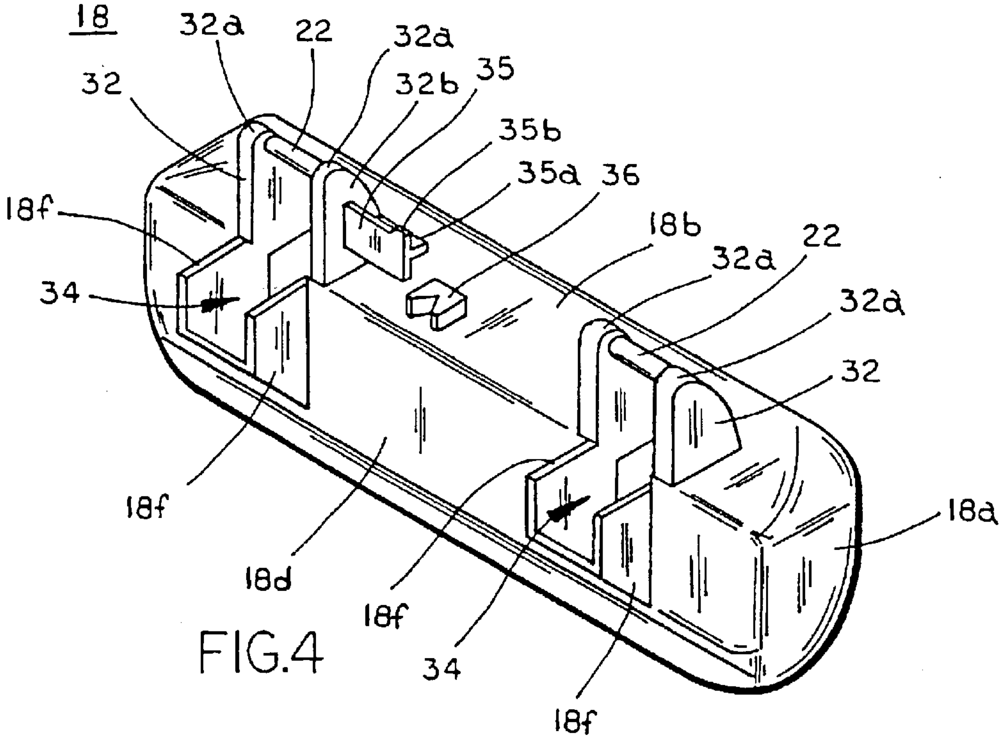
FIG. 4 is a back or rear perspective view of a housing of the handle assembly of FIG. 2.

As shown in FIGS. 2 and 4, base or housing 18 includes a pair of opposite side or end walls 18*a*, an upper wall 18*b*, a lower wall 18*c*, and an inner or back wall 18*d*, which together define a recess or cavity 18*e* for receiving handle portion 16 therein. A pair of mounting extensions 32 extend rearwardly and/or upwardly from upper surface 18*b* and/or inner surface 18*d* near opposite ends or sides thereof. Each axle or cross member 22 is formed at an outer end 32*a* of one of the pair of mounting extensions 32 and extends therebetween. Cross members 22 are generally cylindrical members or pins extending laterally between the outer ends 32*a* of the corresponding pair of mounting extensions 32 and supported at each end by mounting extensions 32. Cross members 22 thus stabilize the mounting extensions 32, thereby reducing vibration of the handle assembly. The Cross members 22 are integrally molded with the mounting extensions 32, which in turn are integrally molded with the upper wall 18*b* and/or inner wall 18*d* of base 18. Preferably, base 18 is integrally molded in one piece from a substantially rigid and strong polymeric material, such as a thermoplastic or a thermoset, such as nylon.

As best seen in FIG. 4, a pair of spaced arm openings 34 is provided along inner surface 18*d* and upper surface 18*b*, one opening positioned generally between each corresponding set or pair of mounting extensions 32. The openings 34 may further include side walls 18*f* extending outwardly from inner surface 18*d* to define a passageway for mounting arms 26 and to further enhance the strength and rigidity of housing 18. The passageway in inner surface 18*d* provides a passageway for mounting arms 26 when handle 10 is at least partially closed, as shown in FIGS. 6 and 7.

Preferably, at least one mounting extension 32*b* includes a spring mounting member 35 (FIGS. 2 and 4–7) which extends laterally from mounting extension 32*b* and functions to mount a biasing member or spring 30 thereon. Spring mounting member 35 preferably extends from an inwardly positioned mounting extension 32*b* and may include a stiffening rib 35*a* therealong to enhance the strength of the spring mounting member 35. Spring mounting member 35 may further include a raised portion 35*b* at an end opposite mounting extension 32*b* to retain spring 30 on spring mounting member 35 and substantially preclude spring 30 from sliding off the spring mounting member 35. Additionally, a notch or tab 36 is preferably formed along upper surface 18*b* of housing 18 and positioned generally adjacent to an end of spring retaining member 35. Tab 36 is provided to engage and secure an end of the coil spring 30, as shown in FIGS. 6 and 7, and discussed below.

Figure 5:
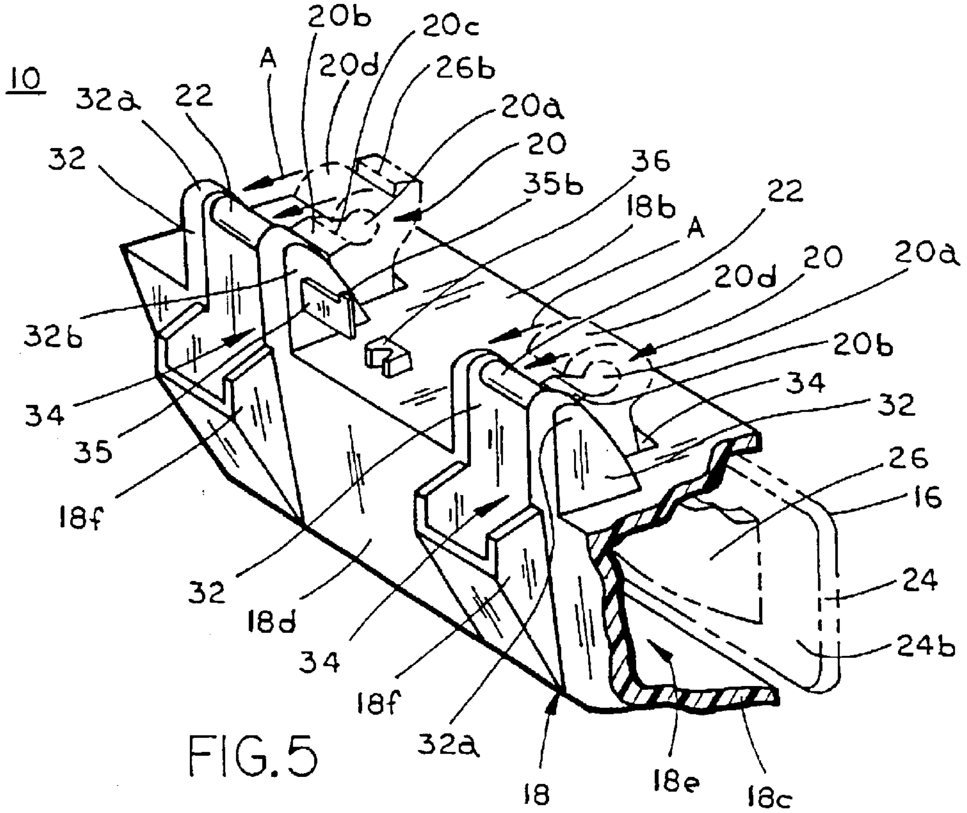
FIG. 5 is a rearward perspective view shown partially in section of the handle portion and housing portion of the handle assembly during the assembly process.

Referring now to FIG. 5, the assembly process of snap clasp members 20 to cross members 22 is shown. Snap members 20 and outer end 26*a* of mounting arms 26 are inserted through openings 34 in upper surface 18*b* and inner surface 18*d* of base 18 from recess 18*e* until openings 20*e* and engaging surfaces 20*b* are generally aligned with cross members 22. To complete the assembly process, snap members 20 are pushed inwardly in the direction of the arrows A toward cross members 22 of base 18. Cross members 22 enter openings 20*e* and initially engage one or both of the tapered guide surfaces 20*b* to further align the cross members 22 with snap members 20. Further inward movement of snap members 20 forces cross members 22 into openings 20*a* of snap members 20. Upper portions 20*d* of snap members 20 flex upwardly in response to cross members 22 moving toward inner end 20*c* of guide surfaces 20*b*, to allow cross members 22 to insert past the narrowed opening at inner ends 20*c* and into cylindrical openings 20*a*. As cross members 22 insert into the cylindrical openings 20*a*, an audible click or snap sound is made as upper portions 20*d* of snap members 20 flex and then snap back into their initial position or form and as cross members 22 are seated within openings 20*a* of snap members 20. Because the guide surfaces 20*b* of snap members 20 diverge toward their outer ends, precise alignment of snap members 20 to cross members 22 is not required. Accordingly, handle assembly 10 can be quickly and easily assembled via insertion of mounting arms 26 through the corresponding openings 34, and then inward movement of snap members 20 toward and into engagement with cross members 22. The inward movement is continued until the audible snap or click signals that the handle assembly is completed.

Figure 6:
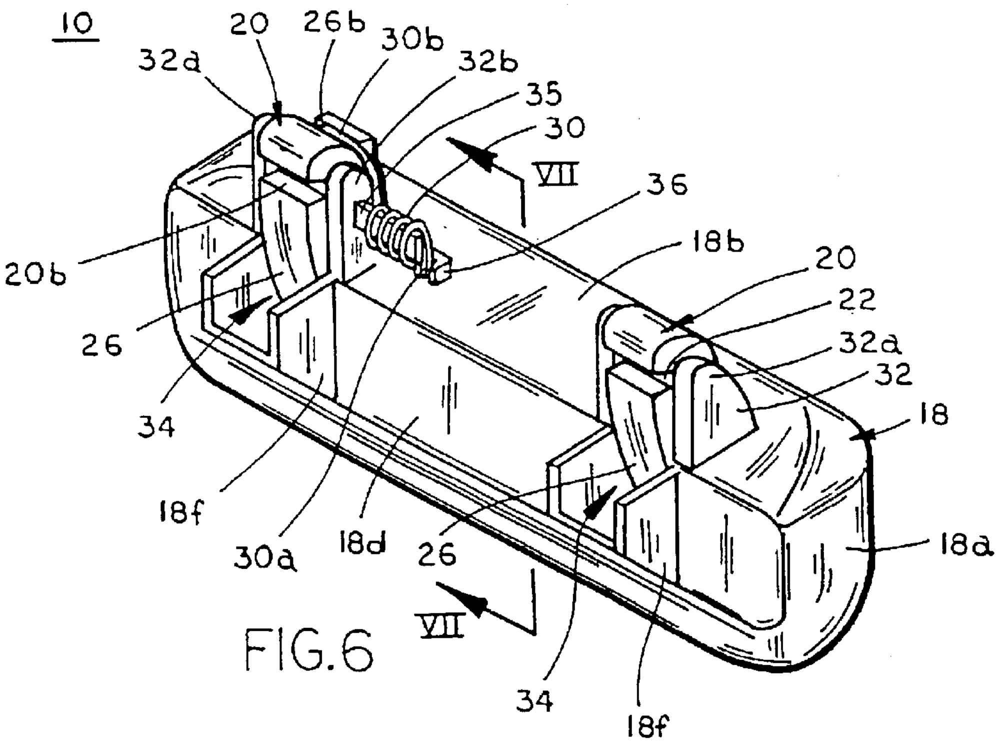
FIG. 6 is a similar view as FIG. 5, with the handle portion pivotably secured to the housing of the handle assembly.
Figure 7:
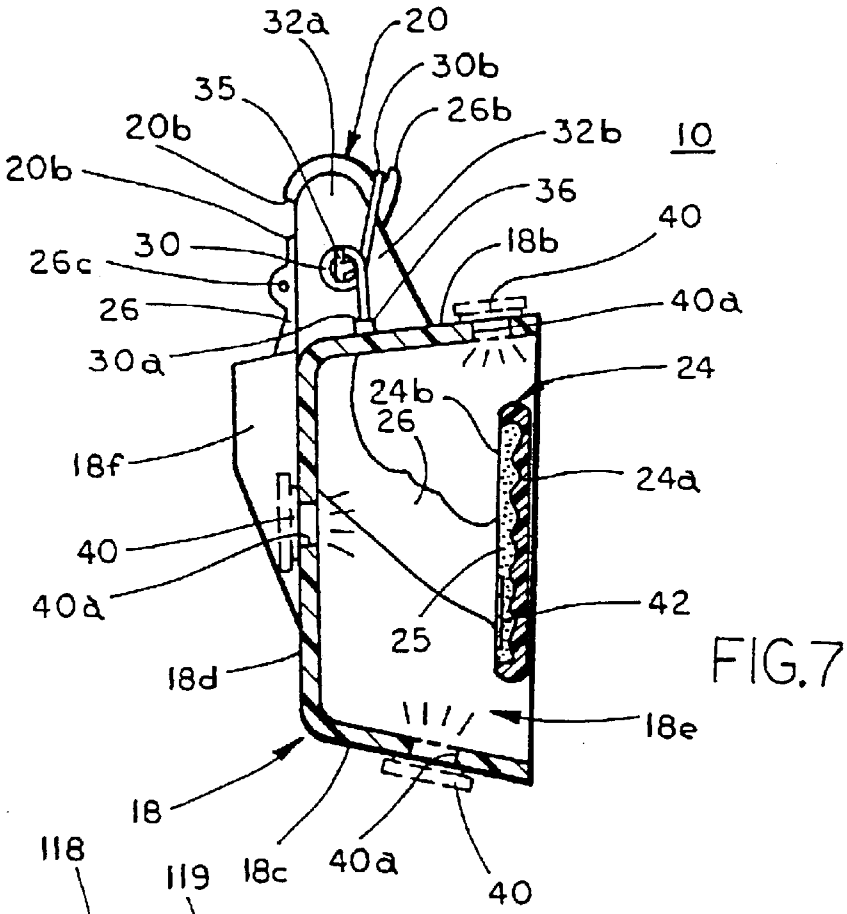
FIG. 7 is a sectional view along the line VII-VII in FIG. 6.

As shown in FIG. 6, after snap members 20 have fully engaged and received cross members 22, snap members 20 on mounting arms 26 of handle portion 16 are pivotable about cross members 22 of handle 16 to move paddle 24 between its opened and closed positions relative to housing 18. Because each cross member 22 is supported at both ends by a pair of mounting extensions 32, the cross members provide improved resistance to twisting or flexing as handle portion 16 is pivoted about cross members 22. The present invention thus provides improved retention of the handle portion to the base of the door handle assembly.

Preferably, biasing member or spring 30 is coiled about spring mounting member 35 on mounting extension 32*b* of housing 18. One end 30*a* of the spring extends downwardly into engagement with spring tab 36 on upper surface 18*b* of housing 18, while the other end 30*b* is curved to engage or rest along a groove formed by spring tab 26*b* on mounting arm 26. Coil spring 30 is coiled and biased such that end 30*b* of spring 30 exerts a downward and/or outward force at spring tab 26*b*, in order to bias handle 16 in its closed position, as shown in FIG. 7. Spring 30 thus provides resistance toward a user pulling outwardly on paddle 24 of handle 16 to open door 12, and functions to return handle 16 to its initial, closed position after the door has been opened or the paddle 24 otherwise released by the user. When the handle 24 is pulled outwardly, the arms 26 pivot and pull outwardly on the door cables or linkages to unlatch or release the door to allow a person to open the door.

Because each snap member pivotably engages a single cross member formed between two protruding extensions or pillars at base 18, the present invention provides a substantially stable, yet pivotable, connection between the handle portion and the base portion. This is a substantial improvement over the prior art, since the pins are secured at both ends to provide a robust mounting structure for the handle. Additionally, because the snap members are guided into engagement with cross members, not only is precise alignment of the components no longer necessary, but the molding tolerances of the present invention may be reduced from that of the molded handle assemblies of the prior art. The present invention thus provides a robust handle assembly which may be quickly and easily assembled at the assembly plant by an operator. The audible click or snap sound also functions to signal a secure clasping of the cross bar by the snap or clasp members, which further aids in proper assembly of the handle.

As shown in FIG. 7, the handle assembly may further comprise one or more illumination sources 40, which are operable to provide illumination at the paddle of the handle assembly. The illumination sources may comprise one or more light emitting diodes (LEDs) or the like which project illumination toward the paddle to facilitate the grasping of the handle by a user in darkened or nighttime conditions. Preferably, the illumination source or sources 40 are mounted along an inner surface of the housing and within the vehicle door, such that illumination source 40 projects illumination through a corresponding opening 40*a* in housing 18. Illumination source 40 may be mounted on a printed circuit board or the like within the vehicle door and generally adjacent to one or more openings 40*a* in housing 18. Illumination source 40 may comprise one or more LEDs, or may comprise electro-luminescent lights, fluorescent lights, incandescent lights or the like, to provide illumination to the handle.

Preferably, illumination source 40 is activatable in response to a detection of a person at the door of the vehicle. Such detection may be via touching of the handle, movement of the handle, actuation of a remote keyless entry module, insertion of a key into the lock cylinder of the door, or a motion detection at the side of the vehicle or the like. Preferably, illumination source 40 is also deactivatable a period of time following activation of the illumination source. The illumination source may thus be temporarily activated as a person approaches or contacts the handle to ease grasping of the handle and thus opening of the door in nighttime conditions. These illumination sources may further provide ground illumination of the area by the vehicle, similar to the safety illumination sources disclosed in commonly assigned U.S. Pat. Nos. 5,371,659, 5,669,699, 5,823,654 and 5,497,305, which are hereby incorporated herein by reference. When activated, the illumination source preferably draws a low or minimal amount of energy from a power source, such as a vehicle battery (not shown) or the like, such that the battery or power source is not overly drained during the period of time that the illumination source is activated.

Alternately, or additionally, paddle 24 may comprise a soft touch handle or surface 25 to enhance the comfort of the handle to a user. Outer surface 24*a* of paddle 24 may be molded from a substantially rigid or hard polymeric material, while inner surface 24*b* is molded with a soft touch material 25 (FIG. 7), which is molded along inner surface 24*b* of rigid plastic paddle 24. Preferably, paddle 24 is also initially molded with an uneven inner surface 24*a*' such that when the soft touch material 25 is later molded at uneven inner surface 24*a*' the two materials are molded together at an increased surface area between the molded materials, which enhances bonding of the materials together. The soft touch material may be molded onto one or more surfaces of the handle portion by a thin film molding process. Alternately, or additionally, a colored film may be provided on one or more surfaces of the handle portion by a thin film molding process. The thin film may be formed first and then a more rigid plastic may be molded or shot inside the film structure to provide structural rigidity to the door handle.

Preferably, the soft touch material comprises a soft material, such as polyolefin or other similar thermoplastic materials, such as Santoprene or the like, and has a material Durometer hardness between at most approximately 80 Shore A Durometer hardness and at least approximately 45 Shore A Durometer hardness. More preferably, the soft touch material has a material hardness of less than or equal to approximately 70 Shore A Durometer hardness and, most preferably, less than or equal to approximately 60 Shore A Durometer hardness. Preferably, the rigid polymeric material of the outer surface comprises a thermoplastic material or a thermoset, such as nylon or the like, which preferably has a material Durometer hardness of at least approximately 80 Shore A Durometer hardness. The back surface 24*b* of the handle thus provides a soft touch to a user of the handle to improve the comfort and grip of the handle. Optionally, the outer surface of paddle 24 may also comprise a soft touch material to further improve the comfort of the handle to a user thereof. The inner and outer soft touch surfaces could be molded around a center portion comprising a rigid material, in order to provide structural integrity to the door handle. Because the soft touch material is not a hard plastic material, the softer material also results in the handle feeling warmer to a person who opens the door in cold weather conditions.

It is further envisioned that paddle 24 may also or otherwise include a heating element 42 near one or both of its surfaces, to generate heat to the paddle to improve the comfort of the handle to the user, especially in winter or other cold weather conditions. The heating element 44 is preferably actuatable in response to an electrical signal, such that paddle 24 is heated prior to a person grabbing the handle to open the door of the vehicle. For example, the heating element may be actuated in response to actuation of a remote keyless entry module, insertion of a key into the lock cylinder or keyhole at the door, a motion detection at the vehicle or the like. Preferably, the heating element quickly warms the handle before the user grasps the handle with their hand. The heating element may be an element embedded within the paddle, or may be a coating on at least one surface of the paddle. The coating may be an electrically conductive material which generates heat in response to an electrical signal applied thereto. The electrical signal may be applied to the heating element via a vehicle door wiring harness (not shown) connected to a wiring (also not shown) routed within and/or along the paddle and one of the mounting arms of the handle portion.

Figure 8:
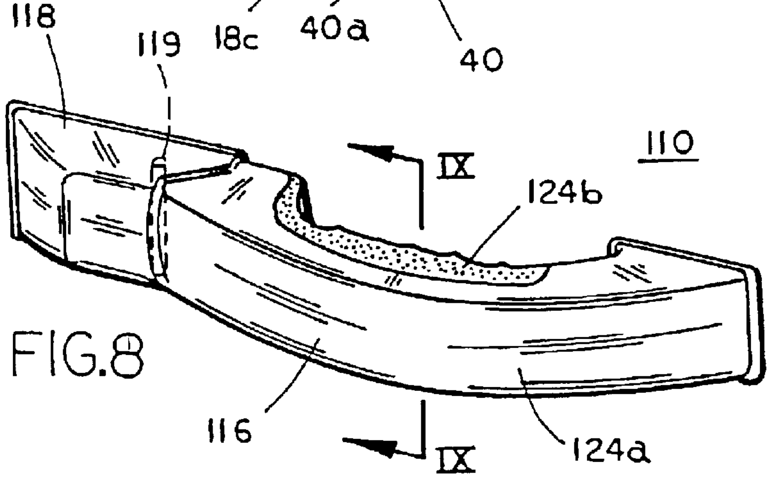
FIG. 8 is a soft touch strap door handle in accordance with the present invention.
Figure 9:
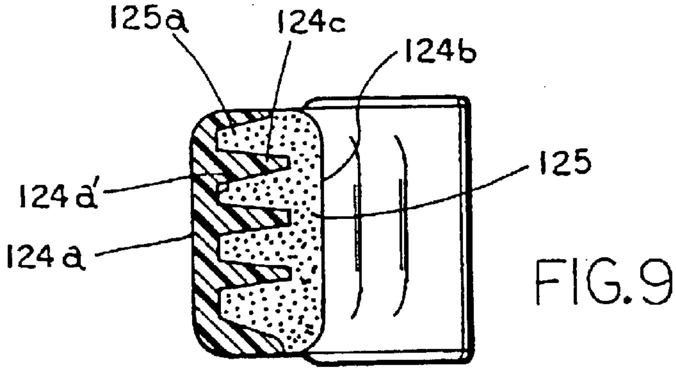
FIG. 9 is a sectional view along the line IX-IX in FIG. 8.

Referring now to FIGS. 8 and 9, a strap door handle 110 comprises a base 118, which is secured at the side of a vehicle door (not shown), and a handle or strap 116, which extends from base 118 and is pivotable about a generally vertical pivot hinge or axis 119 relative to base 118 in order to open the door of the vehicle. Handle 116 has an outer surface 124*a* and an inner surface 124*b*, which comprises a soft touch material 125, such as a flexible rubber material or the like. The outer surface 124*a* is preferably substantially rigid polymeric material to provide strength and rigidity to the handle 116. Preferably, as shown in FIG. 9, the outer material of handle 116 is molded such that an inner surface 124*a*' is unevenly formed. Soft touch material 125 is then molded along the uneven inner surface 124*a*' of the rigid plastic material to enhance the securement of the materials to one another. Preferably, the materials are molded together with a plurality of projections 124*c* and corresponding recesses 125*a* therebetween, in order to further secure the materials together. Similar to handle 10, discussed above, handle 116 of handle assembly 110 may further comprise a heating element to warm a portion of the handle and may further be illuminated by one or more illumination sources positioned adjacent to the handle at the vehicle door.

Therefore, the present invention provides a handle assembly for a door of a vehicle which provides improved assembly and retention of the handle portion onto a base portion secured at the vehicle. Additionally, a soft touch material may be provided to improve the comfort of the handle to a person opening the door of the vehicle. Furthermore, by providing illumination to the handle, the grasping of the handle during nighttime conditions is substantially eased by the illumination source or sources of the present invention.

Changes and modifications in the specifically described embodiments can be carried out without departing from the principles of the invention, which is intended to be limited only by the scope of the appended claims as interpreted according to the principles of patent law.

The embodiments of the invention in which an exclusive property right or privilege is claimed are defined as follows:

1. A vehicle door handle assembly for opening a door of a vehicle comprising:

a base which is mountable at the door of the vehicle;

a handle portion which includes first and second portions, said handle portion being operable to open the door via movement of said handle portion relative to said base, said first portion of said handle portion comprising a first polymeric material having a first material hardness, said second portion of said handle portion comprising a second polymeric material having a second material hardness, said first material hardness being greater than said second material hardness, said second material being joined to said first material, said second material of said second portion providing a soft touch co a user of said handle assembly when the user operates said handle portion to open the door of the vehicle; and an illumination source, said illumination source being operable to provide illumination to said handle portion in response to at least one of a touch of said handle portion, a movement of said handle portion relative to said base, actuation of a remote keyless entry module, and an insertion of a key into a key hole at said vehicle door handle assembly, said illumination source being automatically deactivated a period of time following activation of said illumination source.

2. The vehicle door handle assembly of claim 1, wherein said second portion of said handle portion comprises an inward surface of said handle portion facing generally toward said base and the door, the user engaging said second portion and pulling said handle portion generally away from the door to operate said handle portion to open the door of the vehicle.

3. The vehicle door handle assembly of claim 2, wherein said first portion comprises an outward surface of said handle portion facing generally away from the door.

4. The vehicle door handle assembly of claim 1, wherein said second portion is molded to said first portion.

5. The vehicle door handle assembly of claim 1, wherein said second portion of said handle portion comprises an exterior surface of said handle portion and said first portion of said handle portion comprises a center portion of said handle portion, said exterior surface generally surrounding said center portion.

6. The vehicle door handle assembly of claim 5, wherein said exterior surface is molded around said center portion.

7. The vehicle door handle assembly of claim 5, wherein said exterior surface comprises a thin film, said center portion being molded inside said thin film to provide structural rigidity to said handle portion.

8. The vehicle door handle assembly of claim 1, wherein said second material comprises a thermoplastic material.

9. The vehicle door handle assembly of claim 8, wherein said second material comprises a polyolefin material.

10. The vehicle door handle assembly of claim 9, wherein said second material comprises a Santoprene material.

11. The vehicle door handle assembly of claim 1, wherein said first material comprises a the thermoplastic material.

12. The vehicle door handle assembly of claim 11, wherein said first material comprises a thermoset material.

13. The vehicle door handle assembly of claim 12, wherein said first material comprises a nylon material.

14. The vehicle door handle assembly of claim 1, wherein said second material hardness is less than approximately 80 Shore A Durometer hardness.

15. The vehicle door handle assembly of claim 1, wherein said second material hardness is less than approximately 70 Shore A Durometer hardness.

16. The vehicle door handle assembly of claim 1, wherein said second material hardness is less than approximately 60 Shore A Durometer hardness.

17. The vehicle door handle assembly of claim 14, wherein said first material hardness is greater than approximately 80 Shore A Durometer hardness.

18. The vehicle door handle assembly of claim 1, wherein said at least one illumination source is positioned at at least one of said base and said handle portion.

19. The vehicle door handle assembly of claim 1, wherein said handle portion comprises a heating element which is operable to increase the temperature of at least said second material or said handle portion when said heating element is activated.

20. The vehicle door handle assembly of claim 19, wherein said heating element is positioned within said handle portion.

21. The vehicle door handle assembly or claim 20, wherein said heating element is actuatable in response to said at least one of a touch of said handle portion, a movement of said handle portion relative to said base, actuation of a remote keyless entry module, a motion detection at the vehicle, and an insertion of a key into a key hole at said vehicle door handle assembly.

22. The vehicle door handle assembly of claim 21, wherein said heating element deactuates a period of time following actuation of said heating element.

23. The vehicle door handle assembly of claim 1, wherein said at least one illumination source comprises one of a light emitting diode, an incandescent bulb, a fluorescent light, and an electro-luminescent light.

24. The vehicle door handle assembly of claim 1, wherein said illumination source provides ground illumination of the area by the vehicle when said illumination source is activated.

25. The vehicle door handle assembly of claim 1, wherein said handle assembly comprises a strap door handle comprising an elongated handle portion.

26. The vehicle door handle assembly of claim 25, wherein said elongated handle portion is pivotable about a generally vertical axis relative to said base.

27. The vehicle door handle assembly of claim 1, wherein said illumination source is actuatable in response to a touch of said handle portion by a user.

28. The vehicle door handle assembly of claim 1, wherein said illumination source is actuatable in response to a movement of said handle portion relative to said base.

29. The vehicle door handle assembly of claim 1, wherein said illumination source is actuatable in response to actuation of a remote keyless entry module.

30. The vehicle door handle assembly of claim 1, wherein said illumination source is actuatable in response to a motion detection at the vehicle.

31. The vehicle door handle assembly of claim 1, wherein said illumination source is actuatable in response to an insertion of a key into a key hole at said vehicle door handle assembly.

32. A vehicle door handle assembly for opening a door of a vehicle comprising:

a base which is mountable at the door of the vehicle:

a handle portion which includes first and second portions, said handle portion being operable to open the door via movement of said handle portion relative to said base, said first portion of said handle portion comprising a first polymeric material having a first material hardness, said second portion comprising a second polymeric material having a second material hardness, said first material hardness being greater than said second material hardness, said second material being joined to said first material, said second material of said second portion providing a soft touch to a user of said handle assembly when the user operates said handle portion to open the door of the vehicle; and a heating element positioned within said handle portion and operable to increase a temperature of at least said second portion of said handle portion in response to at least one of a touch of said handle portion, a movement of said handle portion relative to said base, actuation of a remote keyless entry module, a motion detection at the vehicle, and an insertion of a key into a key hole at said door handle assembly wherein said heating element deactivates a period of time following actuation of said heating element.

33. The vehicle door handle assembly of claim 32, wherein said second portion of said handle portion comprises an inward surface of said handle portion facing generally toward said base and the door, the user engaging said second portion and pulling said handle portion generally away from the door to operate said handle portion to open the door of the vehicle.

34. The vehicle door handle assembly of claim 33, wherein said first portion comprises an outward surface of said handle portion facing generally away from the door.

35. The vehicle door handle assembly of claim 32, wherein said second portion is molded to said first portion.

36. The vehicle door handle assembly of claim 32, wherein said second portion of said handle portion comprises an exterior surface of said handle portion and said first portion of said handle portion comprises a center portion of said handle portion, said exterior surface generally surrounding said center portion.

37. The vehicle door handle assembly of claim wherein said exterior surface is molded around said center portion.

38. The vehicle door handle assembly of claim 36, wherein said exterior surface comprises a thin film, said center portion being molded inside said thin film to provide structural rigidity to said handle portion.

39. The vehicle door handle assembly of claim 32, wherein said second material comprises a thermoplastic material.

40. The vehicle door handle assembly of claim 39, wherein said second material comprises a polyolefin material.

41. The vehicle door handle assembly of claim 40, wherein said second material comprises a Santoprene material.

42. The vehicle door handle assembly of claim 32, wherein said first material comprises a thermoplastic material.

43. The vehicle door handle assembly of claim 42, wherein said first material comprises a thermoset material.

44. The vehicle door handle assembly of claim 43, wherein said first material comprises a nylon material.

45. The vehicle door handle assembly of claim 32, wherein said second material hardness is less than approximately 80 Shore A Durometer hardness.

46. The vehicle door handle assembly of claim 32, wherein said second material hardness is less than approximately 70 Shore A Durometer hardness.

47. The vehicle door handle assembly of claim 32, wherein said second material hardness is less than approximately 60 Shore A Durometer hardness.

48. The vehicle door handle assembly of claim 45, wherein said first material hardness is greater than approximately 80 Shore A Durometer hardness.

49. The vehicle door handle assembly of claim 32, further including at least one illumination source at at least one of said base and said handle portion, said at least one illumination source being operable to provide illumination of said handle portion.

50. The vehicle door handle assembly of claim 49, wherein said at least one illumination source comprises one of a light emitting diode, an incandescent bulb, a fluorescent light, and an electro-luminescent light.

51. The vehicle door handle assembly of claim 49, wherein said illumination source is actuatable in response to said at least one of a touch or said handle portion, a movement of said handle portion relative to said base, actuation of a remote keyless entry module, a motion detection at the vehicle, and an insertion of a key into a key hole at said vehicle door handle assembly.

52. The vehicle door handle assembly of claim 51, wherein said illumination source deactuates a period of time following actuation of said illumination source.

53. The vehicle door handle assembly of claim 32, wherein said handle assembly comprises a strap door handle comprising an elongated handle portion.

54. The vehicle door handle assembly of claim 53, wherein said elongated handle portion is pivotable about a generally vertical axis relative to said base.

55. The vehicle door handle assembly of claim 32, wherein said heating element is actuatable in response to a touch of said handle portion by a user.

56. The vehicle door handle assembly of claim 32, wherein said heating element is actuatable in response to a movement of said handle portion relative to said base.

57. The vehicle door assembly of claim 32, wherein said heating element is actuatable in response to actuation of a remote keyless entry module.

58. The vehicle door handle assembly of claim 32, wherein said heating element is actuatable in response to a motion detection at the vehicle.

59. The vehicle door handle assembly of claim 32, wherein said heating element is actuatable in response to an insertion of a key into a key hole at said vehicle door handle assembly.

* * * * *

UNITED STATES PATENT AND TRADEMARK OFFICE

CERTIFICATE OF CORRECTION

PATENT NO. : 6,907,643 B2
APPLICATION NO. : 10/419441
DATED : June 21, 2005
INVENTOR(S) : Koops et al.

It is certified that error appears in the above-identified patent and that said Letters Patent is hereby corrected as shown below:

Column 9
Claim 1, Line 26, "co" should be --to--

Column 10
Claim 11, Line 2, delete "the" after "a"
Claim 19, Line 25, "or" should be --of--
Claim 21, Line 30, "or" should be --of--

Column 11
Claim 32, Line 3, "vehicle:" should be --vehicle;--
Claim 32, Line 24, insert --vehicle-- before "door"
Claim 32, Line 24, insert --,-- after "assembly"
Claim 37, Line 45, insert --36,-- after "claim"

Column 12
Claim 51, Line 31, "touch or" should be --touch of--
Claim 57, Line 51, insert --handle-- after "door"

Signed and Sealed this

Sixth Day of January, 2009

JON W. DUDAS
*Director of the United States Patent and Trademark Office*